United States Patent [19]

Wastell

[11] Patent Number: 4,800,626
[45] Date of Patent: Jan. 31, 1989

[54] SALMON PROCESSING MACHINE

[76] Inventor: Trevor T. Wastell, 7675 Summitt 19.55 Dr., Gladstone, Mich. 49837

[21] Appl. No.: 79,646

[22] Filed: Jul. 30, 1987

[51] Int. Cl.$^4$ .............................................. A22C 25/14
[52] U.S. Cl. ......................................................... 17/63
[58] Field of Search ...................................... 17/59, 67

[56] References Cited

U.S. PATENT DOCUMENTS

| | | | |
|---|---|---|---|
| 1,828,725 | 10/1931 | Muller et al. | 17/59 |
| 2,507,810 | 5/1950 | Oates | 17/63 |
| 2,529,800 | 11/1950 | Erickson | 17/63 |
| 3,123,853 | 3/1964 | Radloff et al. | 17/63 |
| 4,321,729 | 3/1982 | Ollik | 17/63 |
| 4,599,765 | 7/1986 | Kristinsson | 17/63 |

Primary Examiner—Willie G. Abercrombie
Attorney, Agent, or Firm—Andrus, Sceales, Starke & Sawall

[57] ABSTRACT

A machine for processing fish, especially salmon, includes a base, a conveyor on the base for conveying fish along a longitudinal work path, a plurality of work stations for loading, locating, heading, gulleting and transferring the fish, and an indexing mechanism for sequentially moving the conveyor to feed the fish from station to station. The fish locating station is disposed upstream of the heading station and downstream of the loading station, and includes a positioning mechanism engageable within the gill slit of the fish for positioning the head of the fish at a desired location with respect to the heading station and gulleting station to provide depth control so that the fish is beheaded at the optimum location by a guillotine blade at the heading station and the gulleting tool may be inserted the appropriate depth into the fish body cavity after head removal to break the membrane that attaches the egg sack to the body of the fish without damage to the egg sack or eggs themselves.

12 Claims, 4 Drawing Sheets

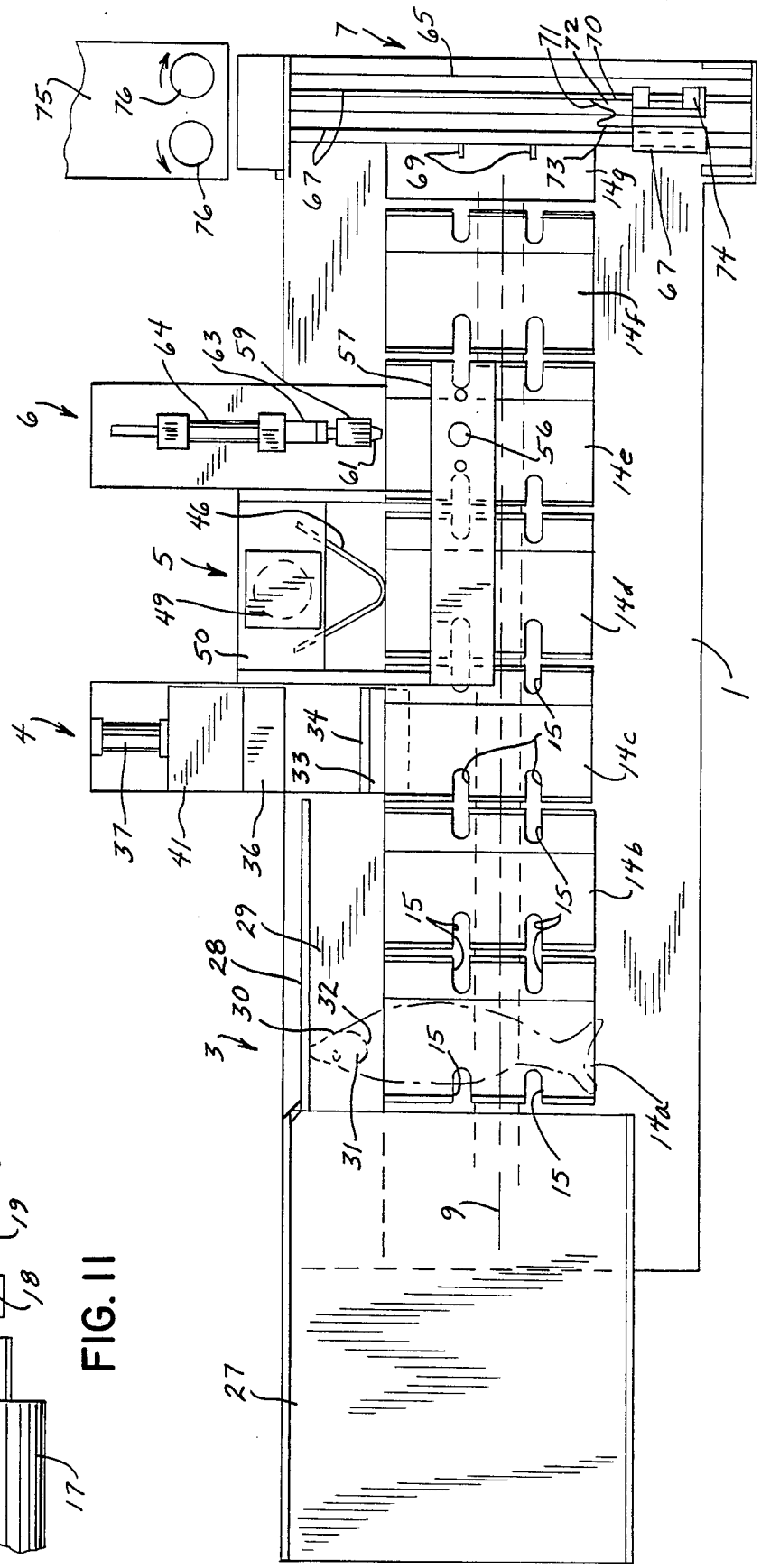
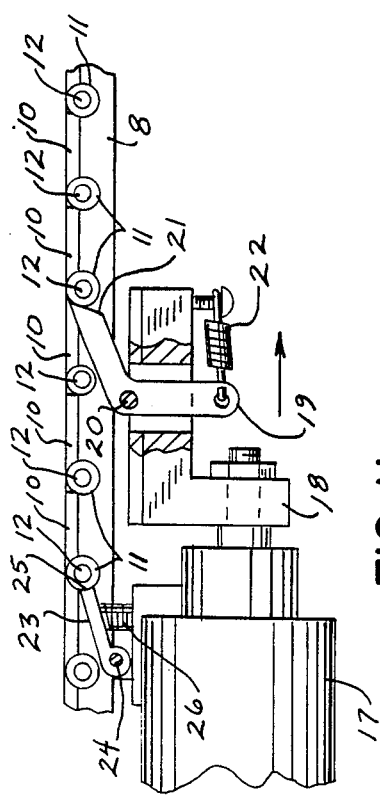

SALMON PROCESSING MACHINE

BACKGROUND OF THE INVENTION

The present invention relates to fish processing, and more particularly to a machine for automatically heading and gulleting fish, especially salmon, and transferring the fish from the machine for further processing.

When processing fish such as salmon it is necessary to behead the fish and then gullet the fish so that the membrane surrounding the salmon eggs or roe is broken, without excessively damaging the eggs. The eggs may then be removed prior to eviscerating and filleting the fish.

In the past, the heading and gulleting operations have been performed by hand. First, an operator would hold a fish by its tail end placing its head end beneath a V-shaped guillotine blade which would then be actuated by the operator to behead the fish. The operator would then pass the beheaded fish to a second operator who would again hold the fish by its tail end and force the open ended body cavity of the beheaded fish onto a rotating gulleting tool which would break the egg membrane. This second operator would then pass the fish to a third operator who would in turn feed it to an egg-saving and eviscerating machine. This manual procedure, however, is very labor intensive and thus expensive and time consuming. Additionally, there is no means for controlling the depth during the heading and gulleting operations other than the operator's experience. Thus, due to the difficulty of properly positioning different size fish with respect to the guillotine blade, meat loss remains a major problem as does excessive damage to the salmon eggs due to the difficulty in controlling the depth of manual insertion of the gulleting tool.

Various types of machines have been developed for heading fish. One such machine is manufactured and sold by Ryan Engineering Inc. of Seattle, Wash. In this machine, the fish are manually located on pins projecting upwardly from a moving conveyor belt by an operator. The fish are then moved downstream and sandwiched between this feed belt and a second belt to hold the fish in position for removing the head with a guillotine blade. This machine, however, has no gulleting station and thus gulleting of salmon still requires a manual operation as does feeding the gulleted fish to an egg saving and eviscerating machine. Additionally, this machine has no positive means for consistently controlling the depth of the guillotine cut.

Other heading machines are designed to produce a straight head cut on species with suitably located pelvic or pectoral fins such as perch, red fish, porgy, croaker, tilapia, mackerel, catfish and many others. In one of these machines, manufactured and sold by Pisces Industries Ltd. of Gladstone, Mich., an operator places the fish in a tray moving on a conveyor belt at an in-feed area. As the trays advance toward the cutting blade, the fish are automatically located by the pelvic or pectorial fin to insure correct position for the head cut. Immediately prior to the cutting blade, the trays grip the fish and hold it in position for the cutting operation. The head and body are then separately ejected from the machine for further processing.

SUMMARY OF THE INVENTION

The present invention provides an improved and simplified machine for automatically heading and gulleting fish, such as salmon, and ejecting or transferring the fish from the machine for further processing. The invention provides means for locating the fish which utilizes the gill slit of the fish for positioning the head of the fish at a desired location with respect to a cutting means. This positioning means properly locates the fish for the heading operation to consistently provide the appropriate depth for the head cut irregardless of the size of the fish, and thus provide maximum meat recovery. The positioning means also locates the fish to provide the appropriate depth control with respect to a gulleting tool which breaks the membrane that attaches the egg sack to the body of the fish without damage to the egg sack or eggs. As a result, the positioning means disclosed herein provides the necessary depth control for maximum meat recovery and minimum egg damage which is lacking in the prior art.

The machine for processing fish includes a base, conveyor means on the base for conveying fish along a longitudinal work path, a fish heading station on the base adjacent the work path which includes cutting means for cutting the head off the fish, a fish locating station on the base adjacent the work path disposed upstream of the heading station and including positioning means engageable within the gill slit of the fish for positioning the head of the fish at a desired location with respect to the cutting means, and indexing means for sequentially moving the conveyor means between the stations.

The positioning means preferably includes a gill catcher plate having an edge receivable within the gill slit of the fish, means for raising the nose of the fish to open the gill slit, and means for moving the fish laterally with respect to the longitudinal work path onto the gill catcher plate. The lateral fish moving means preferably comprises a ram means having a stationary end and a movable end, and the nose raising means preferably comprises a ramp means mounted on the movable end of the ram means.

The fish processing machine also includes a fish loading station on the base adjacent the work path disposed upstream of the locating station for receiving fish in a desired orientation, preferably on their sides with their bellies leading along the work path. The loading station includes an abutment means spaced laterally from the work path against which the nose of the fish is placed to insure that the ramp means of the positioning means will open the gill slit for engagement with the gill catcher plate.

The fish processing machine also includes a fish gulleting station on the base adjacent the work path disposed downstream of the heading station. The fish gulleting station includes clamp means for holding a headed fish in a stationary position on the conveyor means, and a gulleting tool insertable into the headed fish to open the fish gullet, and break the membrane that attaches the egg sack to the body of the fish.

The fish processing machine may also include a fish transfer station on the base disposed downstream of the heading station for receiving headed fish and transferring the headed fish from the machine for further processing. The fish transfer station includes a trough member for receiving the fish, a transfer arm for engaging the fish, and actuating means for moving the transfer arm to eject the fish from the machine for further processing, such as to an egg removal and eviscerating machine.

The indexing means preferrably includes ratchet means mounted on the base for intermittently moving the conveyor means a discrete distance along the work path so that a fish is sequentially moved between the loading, locating, heading, gulleting and transfer stations.

Other features and advantages of the invention will become apparent to those skilled in the art upon reviewing the detailed description, the drawings, and the appended claims.

BRIEF DESCRIPTION OF THE DRAWINGS

The drawings illustrate the best mode presently contemplated of carrying out the invention.

In the drawings:

FIG. 2 is a top plan view of the salmon processing machine shown in FIG. 1;

FIG. 11 is an enlarged detailed side view of the ratchet mechanism for moving the conveyor and fish between the processing stations of the machine.

DESCRIPTION OF THE PREFERRED EMBODIMENT

Figure 1:
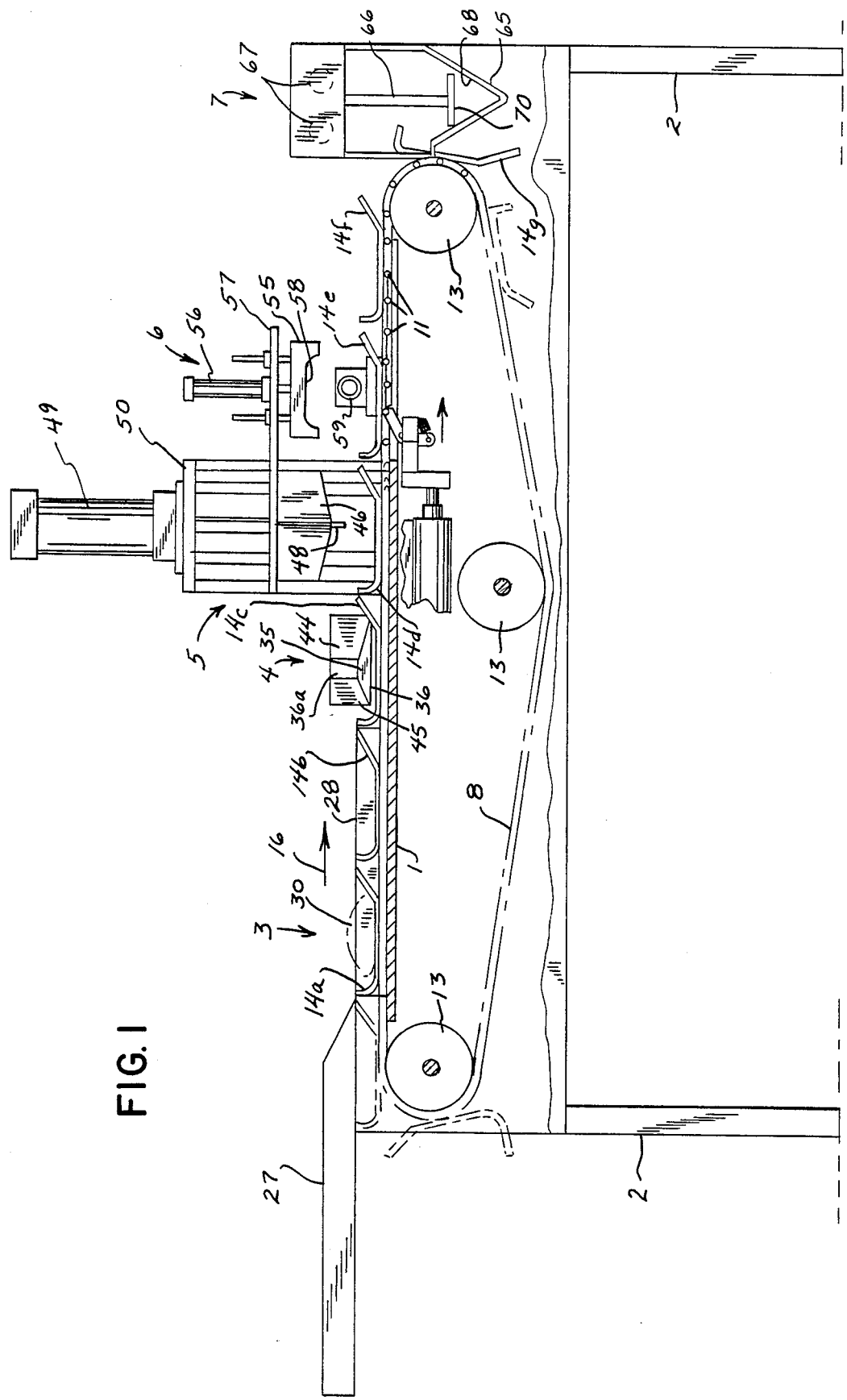
FIG. 1 is a side view in elevation of a salmon processing machine illustrating the preferred embodiment of the present invention.

Referring now to the drawings, FIGS. 1 and 2 illustrate a machine for heading and gulleting fish, especially salmon, and transferring the fish from the machine for further processing. The machine includes a base having a frame 1 supported by legs 2 for mounting the work performing elements of the machine. The work performing elements are mounted on frame 1 and are located at distinct processing stations spaced along frame 1, namely, a fish loading station generally designated by the numeral 3, a fish locating station generally designated by the numeral 4, a fish heading station generally designated by the numeral 5, a fish gulleting station generally designated by the numeral 6 and a fish ejection or transfer station generally designated by the numeral 7.

The salmon processing machine includes a feed conveyor belt 8 for conveying or transporting the fish along a longitudinal work path 9. As shown best in FIG. 11, conveyor belt 8 includes a plurality of metal links 10 each joined through their respective knuckles 11 by a pin 12. As shown best in FIG. 1, belt 8 is trained about three rollers 13 for endless movement on frame 1. A plurality of fish receiving trays (only seven 14a-14g are shown in full lines in FIGS. 1 and 2) are mounted in spaced relationship along belt 8 each comprising a shallow U-shaped member having its longitudinal dimension disposed laterally with respect to work path 9. The leading edge as well as the trailing edge of each tray includes a pair of spaced apart notches 15 formed therein, the purpose of which will hereinafter be described. Each tray 14a-14g includes flange members along its lower surface which engage in a pair of spaced apart longitudinal guide rails (not shown) for properly aligning each tray with respect to stations 3-7 as trays 14a-14g move downstream along work path 9 in the direction of arrow 16 (FIG. 1).

Conveyor belt 8 is driven by an indexing means for sequentially moving trays 14a-14g, and a salmon carried by trays 14a-14g, intermittently between stations 3-7. As best shown in FIG. 11, the indexing means includes a ratchet mechanism for moving conveyor belt 8 and trays 14a-14g a discreet distance along work path 9 so that trays 14a-14g, and a salmon carried therein, are aligned with the work performing elements located at stations 3-7. The ratchet mechanism includes a hydraulic or pneumatic ram 17 having its cylinder end mounted to the undersurface of frame 1 and its rod end connected to a head member 18 movable between extended and retracted positions. A pawl member 19 is pivotally mounted as at 20 on head member 18 with one of its legs extending upwardly to the underside of belt 8 and includes an abutment surface 21 adapted to engage knuckles 11 of links 10 so as to drive belt 8 downstream, or to the right as shown in FIG. 11, when the rod of ram 17 is extended. The opposite end of pawl member 19 is connected to a spring 22 which in turn is mounted on head member 18 to bias abutment end 21 of pawl member 19 upwardly against the underside of belt 8. The ratchet mechanism also includes a pawl member 23 located upstream, or to the left as shown in FIG. 11, of pawl member 19. Pawl member 23 is pivotally mounted as at 24 on the underside of frame 1 and includes an abutment end 25 biased upwardly by spring 26 to engage knuckles 11 of links 10 for preventing backward or rearward motion of belt 8 when head member 18 is retracted by ram 17. The stroke of ram 17 may be adjusted depending upon the length of travel desired for belt 8, and in any event should coincide with the alignment of trays 14 with stations 3-7. Thus, the ratchet mechanism functions to permit intermittent sequential motion of belt 8 in only one direction, namely, in a downstream direction along work path 9.

Referring again to FIGS. 1 and 2, the machine includes a feed tray 27 mounted on frame 1 at the inlet side or left side of the machine. Feed tray 27 may be of any conventional design, and functions as a source or containment area for fish to be processed.

Figure 3:
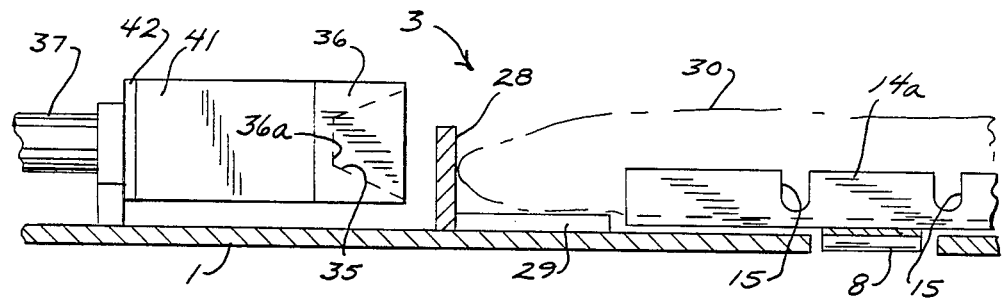
FIG. 3 is a schematic end view showing a salmon positioned at the loading station of the salmon processing machine.

Fish loading station 3 is located immediately downstream from feed tray 27, and includes an upright abutment wall 28 located along the edge of frame 1 and extending parallel to workpath 9. Loading station 3 also includes a support plate 29 located between wall 28 and tray 14a, and extending longitudinally parallel to work path 9. Support plate 29 supports the head of a salmon 30 as it is moved downstream toward locating station 4. As shown best in FIG. 3, salmon 30 is positioned by an operator in tray 14a so that its nose engages the inner surface of abutment wall 28. In this position, the gill plate 31 (see FIG. 2) of salmon 30 is positioned between the edge of tray 14a and wall 28. As shown, salmon 30 is preferably loaded on its side with its belly leading along work path 9 so that the length of salmon 30 lies substantially laterally with respect to work path 9.

Figure 4:
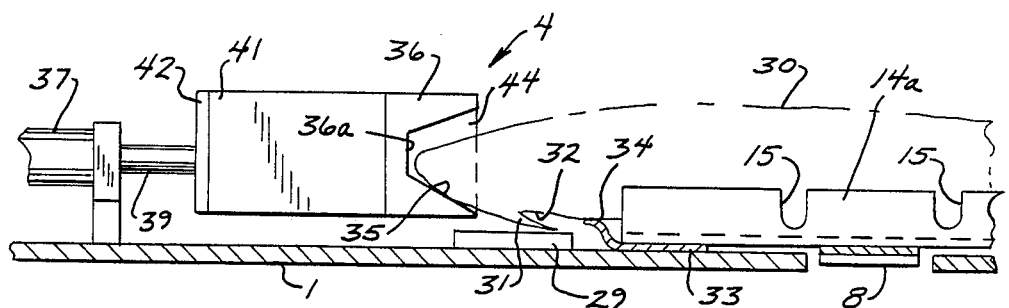
FIG. 4 is a schematic end view illustrating a salmon at the locating station of the salmon processing machine illustrating its nose raised and gill slit open just prior to engagement on a gill catcher plate.
Figure 5:
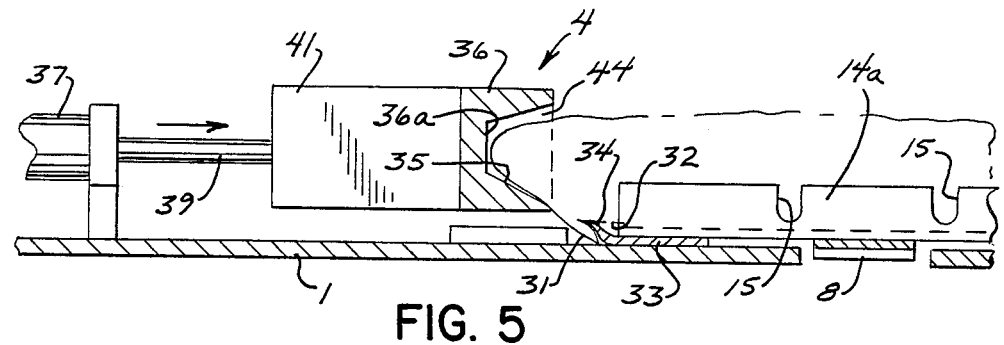
FIG. 5 is a view similar to FIG. 4 illustrating a salmon located on the gill catcher plate.

Fish locating station 4 is disposed on frame 1 adjacent work path 9 downstream from fish loading station 3. Locating station 4 includes a positioning means engageable within gill slit 32 formed behind gill plate 31 of salmon 30 for positioning the head of salmon 30 at a desired location with respect to and for proper presentation to heading station 5 and gulleting station 6. Referring now to FIGS. 2 and 4-6, this positioning means includes a gill catcher plate 33 mounted on the top surface of frame 1 adjacent the downstream edge of support plate 29. Plate 33 includes an upturned edge 34 extending parallel to work path 9 which is spaced from the top surface of frame 1 for engagement within gill slit 32, as will hereinafter be described. The positioning means also includes means for raising the nose of the fish to open the gill slit 32, and means for moving the fish 30 laterally with respect to work path 9 onto gill catcher plate 33. The nose raising means comprises an inclined ramp 35 located along the bottom of a nose cup 36 which in turn is mounted to the rod end of a hydraulic or pneumatic ram 37 mounted on frame 1. Thus, as shown best in FIGS. 4 and 5, as ram 37 extends nose cup 36, ramp 35 engages the nose of salmon 30 raising the nose and head of salmon 30 off of support plate 29 resulting in gill plate 31 separating from the side of salmon 30 to open gill slit 32, as best shown in FIG. 4. As ram 37 continues its stroke, the nose of salmon 30 engages inner edge 36a of nose cup 36 and is forced laterally with respect to work path 9 so that edge 34 of gill catcher plate 33 is registered within gill slit 32.

Figure 6:
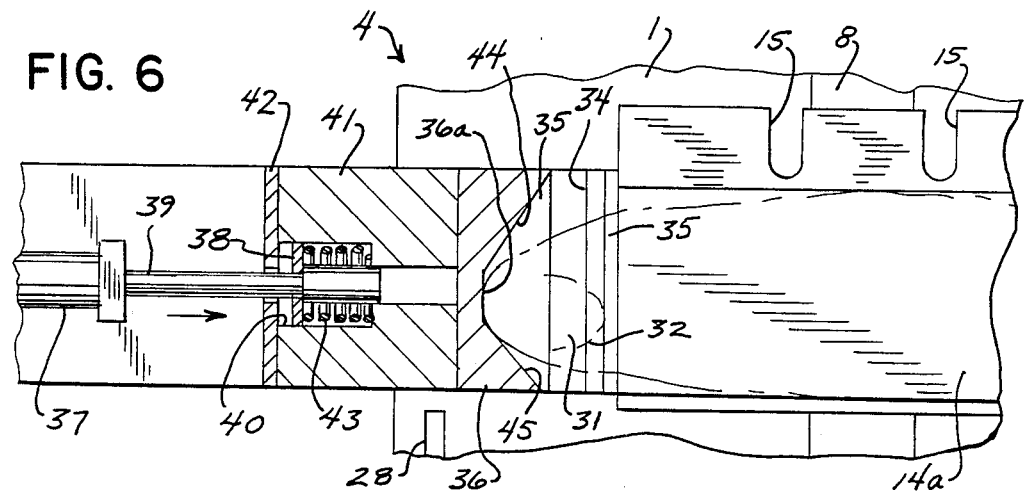
FIG. 6 is a top plan view of a salmon at the locating station.

In order to accommodate for different size fish, ram 37 includes an over-travel mechanism to insure that gill slit 32 is completely engaged on edge 34 irregardless of the size of salmon 30. This over-travel mechanism is best shown in FIG. 6, and includes a retaining ring 38 mounted on the end of rod 39 of ram 37 which is received within a cylindrical bore 40 formed in pusher body 41 which in turn is connected to nose cup 36. Retaining ring 38 is maintained within bore 40 by means of an end plate 42 bolted onto pusher body 41 to cover the open end of bore 40. A coil spring 43 is contained within bore 40 having one end bearing against the blind end of bore 40 and its other end bearing against retaining ring 38. Thus, once edge 34 of gill catcher plate 33 is fully engaged within gill slit 32 of salmon 30 any over-travel of the stroke of rod 39 is compensated for by spring 43 so that gill plate 31 is not torn from the side of salmon 30.

As also shown in FIG. 6, nose cup 36 includes a centering mechanism for centering the head of salmon 30 with respect to the body of salmon 30. This centering mechanism includes opposite vertically extending walls 44, 45 which converge toward one another at the rearward end of ramp 35. Thus, if salmon 30 is skewed with respect to its desired lateral position on trays 14a-14g the nose of salmon 30 will engage either wall 44 or wall 45 to force salmon 30 to be substantially laterally orientated with respect to work path 9 as ram 37 extends to the right as shown in FIG. 6.

Figure 7:
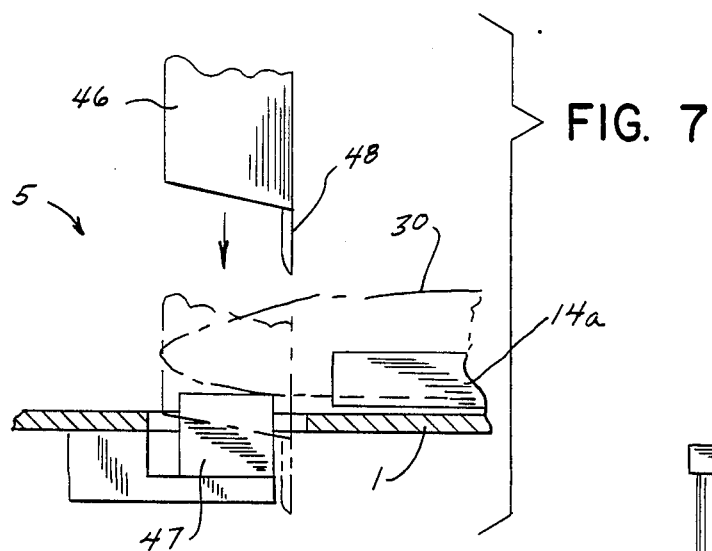
FIG. 7 is a schematic end view of a salmon at the heading station of the machine.

Referring now to FIGS. 1, 2, and 7 fish heading station 5 is located on frame 1 adjacent work path 9 downstream from locating station 4. Heading station 5 includes cutting means for cutting the head off salmon 30. As shown best in FIGS. 1 and 2, this cutting means comprises a guillotine blade 46 located above salmon 30 and an anvil 47 mounted below the head of salmon 30. Blade 46 is V-shaped or U-shaped depending upon the desired cut and includes a spike 48 at its lowermost front edge which leads blade 46 through its substantial vertical cutting path. Blade 46 is actuated by means of an upright hydraulic or pneumatic ram 49 mounted on frame 1 by means of frame work 50. Blade 46 is connected to the rod end of ram 49 such that the stroke of ram 49 forces blade 46 to behead salmon 30.

Figure 8:
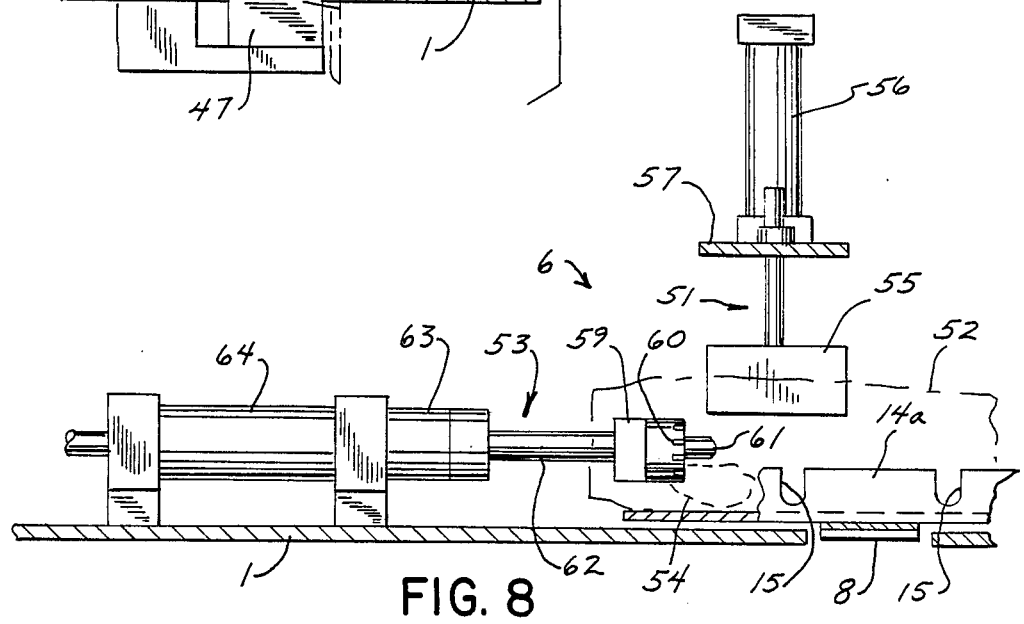
FIG. 8 is a schematic end view of a beheaded salmon at the gulleting station of the machine.
Figure 9:
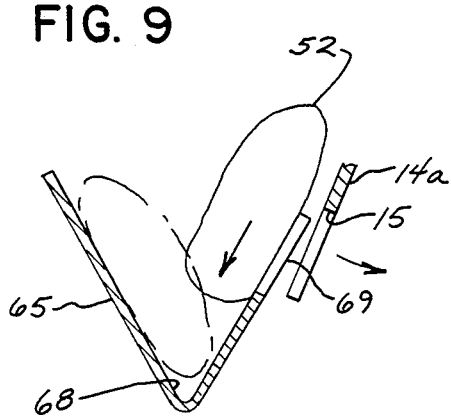
FIG. 9 is a detailed side view of a beheaded salmon at the fish transfer station of the machine.

As best shown in FIGS. 1, 2, and 8, fish gulleting station 6 is mounted on frame 1 adjacent to work path 9 and is disposed downstream from heading station 5. Fish gulleting station 6 includes clamp means 51 for holding a headed salmon 52 in a stationary position on tray 14a, and a gulleting tool 53 insertable into the headed fish cavity to open the fish gullet and break a membrane 54 attaching the egg sack to the body of the fish without damaging the eggs or egg sack themselves. Clamp means 51 includes a jaw member 55 disposed above headed salmon 52 and extending substantially parallel to work path 9. Jaw 55 is mounted on the rod end of an upright hydraulic ram 56 located above jaw 55 and mounted on a support plate 57 projecting from framework 50. Thus, when the rod of hydraulic or pneumatic ram 56 is extended, jaw 55 is forced downwardly to engage headed salmon 52 to hold headed salmon 52 on tray 14a to prevent movement thereof. Jaw 55 includes a concave fish engaging surface 58 thus forming a pair of opposite downwardly directed legs which aid in holding fish 52 within tray 14a.

Gulleting tool 53 includes an outer cylindrical member 59 having a plurality of slots 60 formed therein along its outer edge and a centrally projecting finger 61 of lesser diameter than cylindrical member 59. Gulleting tool 53 is mounted on the end of a shaft which is rotatable by a drill mechanism 63. Drill mechanism 63 in turn is mounted on the rod end of hydraulic end 64 mounted on frame 1. Thus, when a headed salmon 52 is positioned at gulleting station 6, clamp means 51 is actuated to hold salmon 52 in tray 14a and prevent movement thereof while simultaneously gulleting tool 53 is extended by ram 64 into the body cavity of salmon 52 and rotated by drill mechanism 63 to open the fish gullet and break the salmon egg membrane 54 without damaging the eggs therein. Once membrane 54 is detached gulleting tool 53 is retracted by ram 64 and jaw 55 is retracted by ram 56 so that headed salmon 52 may be moved to transfer station 7.

Figure 10:
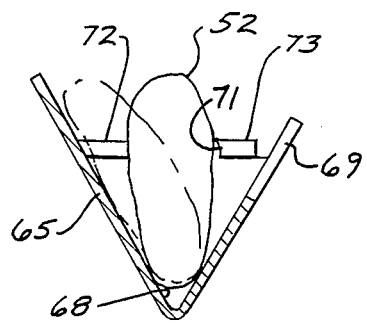
FIG. 10 is a view similar to FIG. 9 illustrating the ejection of a beheaded salmon from the machine.

As shown best in FIGS. 1, 2, 9 and 10, fish transfer station 7 is located on frame 1 downstream of gulleting station 6 and at the end of conveyor belt 8. Transfer station 7 includes a V-shaped trough member 65 having its longitudinal dimension extending laterally with respect to work path 9, as shown best in FIG. 2. Transfer station 7 also includes a transfer arm 66 for engaging headed salmon 52, and actuating means comprising cylinder means 67 for moving transfer arm 66 within trough 65. As shown best in FIG. 1, trough member 65 includes a V-shaped receiving chamber 68 for receiving headed salmon 52 from gulleting station 6. As shown best in FIG. 9, as tray 14a containing headed salmon 52 moves downwardly beneath frame 1 around roller 13 a pair of fingers 69 extending from the upper edge of trough member 65 pass through notches 15 of tray 14a. Fingers 69 provide a guide for headed salmon 52 to slide into chamber 68 of trough member 65 and prevents the belly of salmon 52 from being caught between the edge of tray 14a and the upper edge of trough member 65. However, due to the speed of belt 8 salmon 52 is thrown into chamber 68 and leans against the outer wall of trough 65, as shown in phantom lines in FIG. 9. Thus, headed and gulleted salmon 52 must be straightened within trough member 65 prior to its ejection therefrom for further processing. In order to accomplish this, transfer arm 66 includes a horizontally disposed plate member 70 having a V-shaped notch 71 formed therein to define a pair of horizontally extending fingers 72, 73. As seen best in FIG. 2, outer finger 72 extends further than finger 73 so that as plate member 70 moves within trough member 65 finger 72 engages the side of salmon 52 before finger 73 to raise salmon 52 to a substantially vertical position within chamber 68, as best shown in FIG. 10.

Transfer arm 66 is mounted at its lower end to plate 70 and at its upper end to a carriage 74 mounted for reciprocal sliding movement on cylinders 67. Cylinders 67 include a magnetic actuator or piston therein mounted for reciprocal motion so that carriage 74 moves therewith also in a reciprocal action. Thus, transfer arm 66 reciprocates laterally with respect to work path 9 to eject or transfer fish 52 for further processing, such as egg removable and eviscerating.

In operation, a head-on salmon 30 is placed within tray 14a by an operator on its side belly leading against wall 28 at loading station 3. Thereafter, conveyor belt 8 is advanced by the indexing drive mechanism to move tray 14a and salmon 30 downstream one position so that a second salmon 30 may be placed in the next tray therebehind and tray 14a is now in the position previously held by tray 14b (with tray 14b now in the position previously held by tray 14c, and so on) as designated in FIGS. 1 and 2. The indexing mechanism then drives belt 8 once again to move tray 14a and salmon 30 to the locating station 4 (the position of tray 14c as designated and illustrated in FIGS. 1 and 2) whereby nose cup 36 is extended by ram 37 to locate gill slit 32 on gill catcher plate 33 by moving salmon 30 laterally with respect to work path 9. Thereafter, belt 8 is once again actuated to move tray 14a and the now properly located salmon 30 to heading station 5 (the position of tray 14d as designated and illustrated in FIGS. 1 and 2) whereupon guillotine blade 46 is actuated to behead salmon 30. Thereafter, the indexing means once again drives belt 8 to move tray 14a and the now headed salmon 52 to gulleting station 6 (the position of tray 14e as designated and illustrated in FIGS. 1 and 2) whereupon gulleting tool 53 is extending and rotated to open the gullet of salmon 52 and break egg membrane 54 while simultaneously being held by jaw 55.

Simultaneously with the work performed at gulleting station 6 on salmon 52, heading station 5 is beheading a salmon 30 carried by the tray immediately trailing tray 14a and locating station 4 is positioning a salmon 30 carried by another tray. Also, salmon 30 have been placed by an operator in additional trays at loading station 3 in preparation for stations 4-7. Finally, after gulleting tool 53 is withdrawn from headed salmon 52 and jaw 55 is released, salmon 52 and tray 14a are moved to the next downstream position (that designated and illustrated in FIGS. 1 and 2 as tray 14t) and then the work performing elements at stations 4, 5 and 6 act on salmon carried in the previous trays. Finally, belt 8 is actuated so that tray 14a passes beneath frame 1 to thereby permit headed salmon 52 to fall into trough member 65. Thereafter transfer arm 66 is actuated by cylinder 67 to eject or transfer salmon 52 from trough 65 for further processing. Again, simultaneously with the actuation of transfer arm 66, gulleting tool 53 at station 6, guillotine blade 46 at heading station 5, and nose cup 36 at locating station 4 are actuated to act upon fish carried by trays at those stations. The above sequence is continuously performed by an operator until the desired number of salmon have been processed.

As shown in FIG. 2, transfer station 7 ejects salmon 52 to an egg saving and eviscerating machine 75 which includes an infeed or pickup area having a pair of upstanding rotating rollers 76 which engage salmon 52 therebetween and move it toward the remainder of machine 75. Thus, salmon 52 must also be upright as shown in FIG. 10, when fed from trough 65 to rollers 76.

A salmon processing machine has been illustrated and described. Various modifications and/or substitutions of the specific components described herein may be made without departing from the scope of the invention. For example, various types of blades may be utilized to behead the salmon if desired.

Various modes of carrying out the invention are contemplated as being within the scope of the following claims particularly pointing out and distinctly claiming the subject matter which is regarded as the invention.

I claim:

1. A machine for processing fish, comprising:
    a base;
    conveyor means on said base for conveying fish along a longitudinal work path;
    a fish locating station on said base adjacent said work path disposed upstream of the heading station, said locating station including positioning means engageable within the gill slit of the fish for positioning the head of the fish at a desired location with respect to said cutting means, *said positioning means includes a gill catcher plate having an edge receivable within said gill slit, means for raising the nose of the fish to open the gill slit, and means for moving the fish laterally with respect to said work path onto said gill catcher plate;* and
    indexing means for sequentially moving said conveyor means between said stations.

2. The fish processing machine of claim 1 further including a fish loading station on said base disposed upstream of the locating station for receiving fish in a desired orientation.

3. The fish processing machine of claim 2 wherein said desired orientation comprises the fish lying on its side with its belly leading along said work path.

4. The fish processing machine of claim 3 wherein said fish loading station includes abutment means spaced laterally from said work path against which the nose of the fish is placed.

5. The fish processing machine of claim 1 wherein said cutting means comprises a guillotine blade and moving means for moving said blade along a cutting path to remove the fish head.

6. The fish processing machine of claim 1 wherein said indexing means includes ratchet means mounted on said base for moving said conveyor means a discreet distance along said work path.

7. The fish processing machine of claim 1 further including a fish gulleting station on said base adjacent said work path disposed downstream of the heading station.

8. The fish processing machine of claim 7 wherein said fish gulleting station includes clamp means for holding a headed fish in a stationary position on said conveyor means, and a gulleting tool insertable into the headed fish to open the fish gullet.

9. The fish processing machine of claim 1 further including a fish transfer station on said base disposed downstream of the heading station for receiving headed fish and transferring said headed fish from said conveyor means.

10. The fish processing machine of claim 9 wherein said fish transfer station includes a trough member for receiving the fish, a transfer arm for engaging the fish, and actuating means for moving said transfer arm and said lateral fish moving means comprises ram means having a stationary end and a movable end, and said ramp means is mounted on said movable end.

* * * * *

UNITED STATES PATENT AND TRADEMARK OFFICE
CERTIFICATE OF CORRECTION

PATENT NO. : 4,800,626

DATED : January 31, 1989

INVENTOR(S) : Trevor T. Wastell

It is certified that error appears in the above-identified patent and that said Letters Patent is hereby corrected as shown below:

Claim 1, col. 8, line 29, After the paragraph beginning "conveyor means on said base for. . ." and before the paragraph beginning "a fish locating station. . ." insert the following paragraph ---a fish heading station on said base adjacent said work path, said heading station including cutting means for cutting the head off the fish;---

Signed and Sealed this

Fourteenth Day of November, 1989

Attest:

JEFFREY M. SAMUELS

*Attesting Officer*     *Acting Commissioner of Patents and Trademarks*